United States Patent
Shepler et al.

(10) Patent No.: US 6,359,059 B1
(45) Date of Patent: *Mar. 19, 2002

(54) PAINT COMPOSITIONS CONTAINING REACTIVE UREA/URETHANES

(75) Inventors: Stewart Shepler; Patrick J. Mormile, both of Bowling Green; Sudhakar Dantiki, Toledo; David W. Braun, Whitehouse, all of OH (US)

(73) Assignee: BASF Corporation, Southfield, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/813,126

(22) Filed: Mar. 7, 1997

Related U.S. Application Data

(63) Continuation of application No. 08/486,675, filed on Aug. 14, 1995, now abandoned, which is a continuation of application No. 08/382,731, filed on Feb. 2, 1995, now abandoned.

(51) Int. Cl.$^7$ .............................. C08J 3/00; C08K 3/20; C08L 75/00; C08F 8/30

(52) U.S. Cl. .................. 524/590; 524/507; 524/539; 524/589; 524/591; 525/123; 525/127; 525/128; 525/131; 525/452; 525/453; 525/454; 525/455; 525/457; 525/458; 525/459; 528/44; 528/45; 528/48; 528/49

(58) Field of Search ................... 524/507, 539, 524/589, 590, 591; 525/123, 127, 128, 131, 452, 453, 454, 455, 457, 458, 459; 528/44, 45, 48, 49

(56) References Cited

U.S. PATENT DOCUMENTS

| | | | | | |
|---|---|---|---|---|---|
| 3,975,457 | A | * | 8/1976 | Chang et al. | 428/425 |
| 4,153,775 | A | * | 5/1979 | Winkelmann et al. | 528/45 |
| 4,180,489 | A | * | 12/1979 | Andrew et al. | 428/402 |
| 4,555,535 | A | * | 11/1985 | Bednarek et al. | 524/590 |
| 5,063,091 | A | * | 11/1991 | Martorano | 427/385.5 |
| 5,977,245 | A | * | 11/1999 | Shah et al. | 524/590 |

* cited by examiner

*Primary Examiner*—Patrick D. Niland

(57) ABSTRACT

Low VOC automotive paint compositions containing reactive urea/urethanes are disclosed. Clearcoat and single stage topcoat formulations are found to be especially useful according to this invention.

15 Claims, No Drawings

PAINT COMPOSITIONS CONTAINING REACTIVE UREA/URETHANES

This is a continuation of application Ser. No. 08/486,675 filed on Aug. 14, 1995 now abandoned which is a continuation of application Ser. No. 08/382,731 filed on Feb. 2, 1995 now abandoned.

FIELD OF THE INVENTION

The present invention relates to paint compositions, and more particularly to automotive paint compositions having low volatile organic content (VOC).

Automotive paint compositions according to the present invention comprise pigmented single stage topcoat formulations and clear coat formulations which contain reactive urea/urethanes (RUU's) that can be made to contain low VOC.

BACKGROUND OF THE INVENTION

The present invention is directed to automotive paint compositions, particularly those that have a high solids content and low VOC properties. Typically, low VOC coatings have been found to exhibit below average drying and curing properties when compared to conventional automotive coatings with long dust-free and tack-free times and short pot and shelf life. According to one aspect of the present invention, improved low VOC coating compositions with improved drying, curing and durability are disclosed.

Any substrate material can be coated with the coating composition according to the present invention. These substrate materials include such things as glass, ceramics, paper, wood, and plastic. The coating system of the present invention is particularly adapted for metal substrates, and specifically as an automotive re-finish system. The substrate may be uncoated material or can be primed. The substrate may also be coated with paint products applied at the time of manufacture. The coating composition can be applied using conventional spray equipment or high volume low pressure spray equipment resulting in a high quality finish. Other modes of application are roller coating, brushing, sprinkling, flow coating, dipping, electrostatic spraying, or electrophoresis. Exemplary metal substrates include such things as steel, aluminum, copper, zinc, magnesium and alloys thereof. The components of the compositions can be varied to suit the temperature tolerance of the substrate material. For example, the components can be constituted for air drying (e.g. less than 100° F.), low temperature cure (e.g.100° F.–180° F.), or high temperature cure ( e.g. over 180° F.).

SUMMARY OF THE INVENTION

The present invention relates to a novel coating composition comprising:
 a) 5–65 percent by total weight of a crosslinkable co-vehicle,
 b) 10 to 50 percent by total weight of an organic solvent,
 c) 1 to 90 percent by total weight of a reactive urea/urethane,
 d) 0 to 30 percent by total weight of a reactive diluent,
 e) 10 to 50 percent by total weight isocyanate crosslinker,
 f) 0 to 10 percent by total weight of additives,
 g) 0 to 35 percent by total weight pigments.

According to one aspect of the present invention, improved low VOC coating compositions with improved drying, curing, durability are disclosed.

The coating compositions of the present invention can be used as the basecoat of pigmented basecoat/clearcoat coating, as a pigmented single stage colorcoat, or as the clearcoat of a basecoat/clearcoat coating. It is preferred to use the coatings of the present invention as a single stage colorcoat and the clearcoat of a basecoat/clearcoat coating. Although the single stage colorcoat and the clearcoat of a basecoat/clearcoat coating is preferred, it will be appreciated that the coatings described herein are not intended to limit the utility of the reactive urea/urethane.

The coating composition useful to form the single stage topcoat formulation as well as basecoat formulations and clearcoat formulations are typically made from copolymer compositions characterized as polymerization products of ethylenically unsaturated monomers containing hydroxyl groups and other vinyl monomers wherein the copolymer components are combined in such a manner to give a polymer with a moderate glass transition temperature preferably between about −3° C. to about 35° C. (using the Fox method of Tg calculation) and a relative weight average molecular weight of less than 10,000. The molecular weight is preferably from about 1,000–7,000 based on GPC using polystyrene standards. The hydroxyl number is preferably between 75 and 175 (mg KOH per gram of non-volatile resin). The acid number is preferably between 0 and 10 (mg KOH per gram of non-volatile resin). The ethylenically unsaturated monomers may be selected from, but are not limited to the group essentially consisting of: ethylene and/or ethylenically unsaturated alkyl (meth)acrylates such as methyl (meth)acrylate, ethyl (meth)acrylate, propyl (meth)acrylate, 2-propyl (meth)acrylate, butyl (meth)acrylate, 2-butyl(meth)acrylate, 2-methylpropyl (meth)acrylate, t-butyl (meth)acrylate, 2-ethylhexyl (meth)acrylate, cyclohexyl (meth)acrylate, lauryl (meth)acrylate, octyl (meth)acrylate, decyl (meth)acrylate, stearyl (meth)acrylate, dicyclopentadienyl (meth)acrylate, and isobornyl (meth)acrylate; aryl monomers such as styrene, alpha-methyl styrene, vinyl toluene, t-butyl styrene, benzyl (meth)acrylate, and 2-benzylethyl (meth)acrylate; hydroxy monomers such as hydroxyethyl (meth)acrylate, hydroxypropyl (meth)acrylate, hydroxybutyl (meth)acrylate, sec-hydroxybutyl (meth)acrylate, and hydroxyoctyl (meth)acrylate; acid functional monomers such as acrylic acid and methacrylic acid as described in related copending U.S. application Ser. No. 353,990 filed May 19, 1989 and incorporated herein by reference, hereinafter described as acrylic solution #1.

DESCRIPTION OF PREFERRED EMBODIMENT

The present invention relates to a novel coating composition comprising:
 a) 5–65 percent by total weight of a crosslinkable co-vehicle,
 b) 10 to 50 percent by total weight of an organic solvent,
 c) 1 to 90 percent by total weight of a reactive urea/urethane,
 d) 0 to 30 percent by total weight of a reactive diluent,
 e) 10 to 50 percent by total weight isocyanate crosslinker,
 g) 0 to 10 percent by total weight of additives,
 h) 0 to 35 percent pigments.

According to one aspect of the present invention, improved low VOC coating compositions with improved drying, curing, durability are disclosed.

It is preferred to use the coatings of the present invention as a single stage colorcoat and the clearcoat of a basecoat/clearcoat coating. Although the single stage colorcoat and clearcoat is preferred, it will be appreciated that the coatings described herein are not intended to limit the utility of the reactive urea/urethanes.

Especially preferred are low VOC single stage topcoats comprising about 25 to 50 percent crosslinkable co-vehicle, 10 to 50 percent solvents, 1 to 60 percent reactive urea/urethane, 0 to 30 percent reactive diluent, 10 to 50 percent crosslinking agents, 0 to 10 percent additives such as accelerators, mar and slip agents, flow modifiers, anti-settle agents, wetting agents, ultra-violet light absorbers and stabilizers and 0.1 to 35 percent pigments and low VOC clearcoats comprising about 25 to 50 percent crosslinkable co-vehicle, 10 to 50 percent solvents, 1 to 60 percent reactive urea/urethane, 0 to 30 percent reactive diluent, 10 to 50 percent crosslinking agents, and 0 to 10 percent additives such as accelerators, mar and slip agents, flow modifiers, anti-settle agents, wetting agents, ultra-violet light absorbers and stabilizers.

Preferred crosslinkable co-vehicles, when crosslinked with isocyanate crosslinker, form coatings which have excellent physical properties with short tack-free and dust-free time, excellent pot-life, and no strong odor. A useful crosslinkable co-vehicle can essentially consist of the polymerization product of ethylenically unsaturated monomers containing hydroxyl groups and other vinyl monomers wherein the copolymer components are combined in such a manner to give a polymer with a moderate glass transition temperature preferably between about −3° C. to about 35° C. (using the Fox method of Tg calculation) and a relative weight average molecular weight of less than 10,000. The molecular weight is preferably from about 1,000–7,000 based on GPC using polystyrene standards. The hydroxyl number is preferably between 75 and 175 (mg KOH per gram of non-volatile resin). The acid number is preferably between 0 and 10 (mg KOH per gram of non-volatile resin). The ethylenically unsaturated monomers may be selected from, but are not limited to the group essentially consisting of: ethylene and/or ethylenically unsaturated alkyl (meth) acrylates such as methyl (meth)acrylate, ethyl (meth) acrylate, propyl (meth)acrylate, 2-propyl (meth)acrylate, butyl (meth)acrylate, 2-butyl(meth)acrylate, 2-methylpropyl (meth)acrylate, t-butyl (meth)acrylate, 2-ethylhexyl (meth) acrylate, cyclohexyl (meth)acrylate, lauryl (meth)acrylate, octyl (meth)acrylate, decyl (meth)acrylate, stearyl (meth) acrylate, dicyclopentadienyl (meth)acrylate, and isobornyl (meth)acrylate; aryl monomers such as styrene, alpha-methyl styrene, vinyl toluene, t-butyl styrene, benzyl (meth) acrylate, and 2-benzylethyl (meth)acrylate; hydroxy monomers such as hydroxyethyl (meth)acrylate, hydroxypropyl (meth)acrylate, hydroxybutyl (meth)acrylate, sec-hydroxybutyl (meth)acrylate, and hydroxyoctyl (meth) acrylate; acid functional monomers such as acrylic acid and methacrylic acid.

Another useful crosslinkable co-vehicle can essentially consist of the polymerization product of ethylenically unsaturated monomers containing vinyl monomers wherein at least one of the vinyl monomers is glycidyl or acid functional, and optionally vinyl monomers containing hydroxyl groups wherein the copolymer components are combined in such a manner to give a polymer with a moderate glass transition temperature as defined above and a relative weight average molecular weight of less than 10,000 preferably from about 1,000–7,000 based on GPC using polystyrene standards. The hydroxyl number is preferably between 75 and 175 (mg KOH per gram of non-volatile resin). The acid number is preferably between 5 and 15 (mg KOH per gram of non-volatile resin). The ethylenically unsaturated monomers may be selected from but not are not limited to the group essentially consisting of: ethylene and/or ethylenically unsaturated monomers alkyl (meth)acrylates such as methyl (meth)acrylate, ethyl (meth) acrylate, propyl (meth)acrylate, 2-propyl (meth)acrylate, butyl (meth)acrylate, 2-butyl(meth)acrylate, 2-methylpropyl (meth)acrylate, t-butyl (meth)acrylate, 2-ethylhexyl (meth) acrylate, cyclohexyl (meth)acrylate, lauryl (meth)acrylate, octyl (meth)acrylate, decyl (meth)acrylate, stearyl (meth) acrylate, dicyclopentadienyl (meth)acrylate, and isobornyl (meth)acrylate; aryl monomers such as styrene, alpha-methyl styrene, vinyl toluene, t-butyl styrene, benzyl (meth) acrylate, and 2-benzylethyl (meth)acrylate; hydroxy monomers such as hydroxyethyl (meth)acrylate, hydroxypropyl (meth)acrylate, hydroxybutyl (meth)acrylate, sec-hydroxybutyl (meth)acrylate, and hydroxyoctyl (meth) acrylate; acid functional monomers such as acrylic acid, methacrylic acid, maleic acid, and itaconic acid; glycidyl functional monomers such as glycidyl (meth)acrylate. Optionally this crosslinkable co-vehicle may be subsequently or in situ reacted to a fatty acid through glycidyl groups or reacted to an oxirane functional compound such as the glycidyl ester of an organic acid through organic acid groups.

The crosslinkable co-vehicle can also consist essentially of an acrylic polymer partially esterified by means of a natural or synthetic fatty acid, obtained from the following classes with relative proportions of 1) 5% to 60% by weight of groups originating from the olefinic polymerization of styrene or of a-methyl- styrene or of vinyl toluene.
2) 10% to 70% by weight of groups originating from the olefinic polymerization of a hydroxyalkyl acrylate or methacrylate in which the alkyl group contains 2 to 12 carbon atoms and preferably from 2 to 6 carbon atoms.
3) 5% to 60 % by weight of groups originating from the olefinic polymerization of one or more alkyl mono-,di-, or triacrylates or methacrylates, in which the alkyl group contains 2 to 18 carbon atoms and preferably from 2 to 6 carbon atoms, characterized in that it comprises successively
   a) an olefinic polymerization carried out without a chain transfer agent in a solvent between 140° C. and 160° C. with a free radical initiator catalyst and,
   b) a partial esterification in a solvent between 165° C. and 185° C. with an esterification catalyst; the said polymer being partially esterified, on its hydroxyl groups, by means of a saturated or unsaturated synthetic or optionally modified natural fatty acid. The quantity of fatty acid employed representing from 10% to 25% by weight of the said partially esterified polymer with a final product having a hydroxyl number of between 100 and 160 (mg KOH per gram of non-volatile resin), and an acid number of 0 to 10 (mg KOH per gram of non-volatile resin).

These reactive urea/urethanes typically are aromatic, aliphatic, or cycloaliphatic ureas or urea/urethanes containing reactive groups other than isocyanate groups.

These materials may be referred to as reactive urea/urethanes because they contain reactive groups other than isocyanate which can be used to crosslink with other compounds containing isocyanates, amines, and other crosslinking agents known to the art. Reactive urea/urethanes may have primary, secondary, or tertiary hydroxyl groups; primary, secondary, or tertiary amine groups; carboxyl groups, oxirane groups and may contain unsaturation as well as other reactive constituent groups. These reactive urea/ urethanes are essentially free of isocyanate groups, are of low to medium molecular weight, and contain free reactive groups other than isocyanates. These free reactive groups are especially useful to provide for crosslinking in coatings. Reactive urea/urethanes so produced are especially useful in coating compositions and in particular in auto refinish paint compositions. For example, the components can be constituted for air drying (e.g. less than 100° F.), low temperature cure (e.g.100° F.–180° F.), or high temperature cure ( e.g. over 180° F.), or radiation cured coatings.

The present invention relates to novel hydroxyl functional urethane/urea compounds, their preparation and use. In particular, the present invention relates to a process for the production of compounds containing reactive groups and to the reactive compounds produced thereby. Primary hydroxyl groups are especially useful reactive groups and are especially useful on polymers for use in refinish paint compositions. The preferred urea/urethane compounds are referred to as reactive urea/urethane compounds because they contain reactive groups such as the preferred hydroxyl groups. Reactive groups such as carboxyl, epoxy, mercaptan, alkoxysilane, etc. may also be useful on urea/urethane compounds for use in refinish paint compositions.

The present invention also relates to a process for the production of urea/urethane compounds containing reactive groups such as the preferred primary hydroxyl groups. The products are referred to as reactive urea/urethane compounds because they contain reactive groups such as hydroxyl groups which can be used to cross link with other compounds containing isocyanates. An urea/urethane compound is a low molecular weight polymer with a degree of polymerization less than ten.

The reactive urea/urethane oligimeric compounds of the present invention are especially useful in automotive refinish coating compositions. These coatings can be designed as air-dry, oven bake or radiation cured coatings.

The coating compositions of the present invention typically comprise the following:
(i) a principals resin such as an acrylic, polyester, acrylester or urethane resin containing functional groups such as hydroxyl, carboxyl, and amino functional groups.
(ii) a reactive urea/urethane compound compatible with the principal resin.
(iii) an isocyanate curing agent and optionally
(iv) additives such as accelerators, anti-sagging agents, flow agents, driers, UV absorbers etc. known in the coating art.

According to the present invention, the preferred utility of the reactive urea/urethane compound is in low VOC coating compositions. However, it is not the intent of the invention to limit the utility of the reactive urea/urethane compounds to only these compositions. Utility is also found in higher VOC coating compositions. A useful principal resin used in preparing higher VOC coating compositions according the present invention is an acrylic which can essentially consist of the polymerization product of ethylenically unsaturated monomers containing hydroxyl groups and other vinyl monomers wherein the copolymer components are combined in such a manner to give a polymer with a glass transition temperature preferably between about −3° C. to about 80° C. (using the Fox method of Tg calculation) and a relative weight average molecular weight of greater than 7,000. The molecular weight is preferably from about 7,000–25,000 based on GPC using polystyrene standards. The hydroxyl number is preferably between 60 and 175 (mg KOH per gram of non-volatile resin). The acid number is preferably between 0 and 20 (mg KOH per gram of non-volatile resin). The ethylenically unsaturated monomers may be selected from, but are not limited to the group essentially consisting of: ethylene and/or ethylenically unsaturated alkyl (meth)acrylates such as methyl (meth)acrylate, ethyl (meth)acrylate, propyl (meth)acrylate, 2-propyl (meth)acrylate, butyl (meth)acrylate, 2-butyl(meth)acrylate, 2-methylpropyl (meth)acrylate, t-butyl (meth)acrylate, 2-ethylhexyl (meth)acrylate, cyclohexyl (meth)acrylate, lauryl (meth)acrylate, octyl (meth)acrylate, decyl (meth) acrylate, stearyl (meth)acrylate, dicyclopentadienyl (meth) acrylate, and isobornyl (meth)acrylate; aryl monomers such as styrene, alpha-methyl styrene, vinyl toluene, t-butyl styrene, benzyl (meth)acrylate, and 2-benzylethyl (meth) acrylate; hydroxy monomers such as hydroxyethyl (meth) acrylate, hydroxypropyl (meth)acrylate, hydroxybutyl (meth)acrylate, sec-hydroxybutyl (meth)acrylate, and hydroxyoctyl (meth)acrylate; and acid functional monomers such as acrylic acid and methacrylic acid.

The reactive urea/urethane compounds typically combine the reaction product of an isocyanate with an alkanolamine that can be represented as:

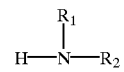

where
R$_1$=alkyl or cycloaliphatic or benzylic moiety with a hydroxyl group.
R$_2$=Hydrogen or alkyl or cycloaliphatic or benzylic moiety with or without a hydroxyl group, and
R$_1$+R$_2$ should consist of less than or equal to 12 carbon atoms.

Suitable amines are the alkanolamines and include but are not limited to: 2-(propylamino)ethanol, 2-(Methylamino) ethanol, 2-(Ethylamino)ethanol, 2-(t-Butylamino)ethanol, 2-(n-Butylamino)ethanol, Diisopropylamine and Diethanolamine.

The alkanolamine useful in this invention should consist of a total of 12 or less carbon atoms. Higher number of carbon atoms in the alkanolamines would change the flexibility and physical drying characteristics of the final product and make it less desirable in the coatings application.

Suitable isocyanates useful in the invention include di- or polyisocyanates which are aliphatic, cycloaliphatic or aromatic. Such isocyanates include hexamethylene diisocyanate, 1-methyl-2,4-diisocyanato-cyclohexane, isophorone diisocyanate, 4, 4'-diisocyanatodicyclohexyl methane, toluene-2,4-diisocyanate, o- m- and p-xylene diisocyanate, 1,5-naphthalene diisocyanate, masked isocyanates, or mixtures thereof. It is also possible to use polyisocyanates with isocyanurate, uretdione, biuret, allophanate or oxadiazenetrione structures.

In addition, aliphatic, aromatic and/or other groups can also be incorporated into the urea/urethane compounds by the reaction of —N=C=O groups on the polyisocyanate with other reactants containing abstractable hydrogens such as alcohols.

The reactive urea/urethane compounds oligomers preferably contain primary hydroxyl groups , low molecular weight, preferably with a weight average molecular weight less than 6000, as measured by gel permeation chromatography relative to polystyrene standards, a low polydispersity , preferably less than 2.0, and a high Tg or hardness.

Aliphatic, aromatic and/or other groups can also be incorporated into the urea/urethane compound by the reaction of —N=C=O groups on the polyisocyanate with other reactants containing abstractable hydrogens such as alcohols.

More specifically the present reactive urea/urethanes relate to the reaction product of an isocyanate preferably a triisocyanurate or a trimer, with a multi-functional chemical reagent containing at least one group with an active hydrogen atom. Typical isocyanates useful in the invention include isophorone diisocyanate, tetramethyl xylene diisocyanate, dicyclohexylmethane-4,4'-diisocyanate, trimer of tetramethylxylene diisocyanate, triisocyanurate of isophorone diisocyanate, and triisocyanurate of hexamethylene diisocyanate. Some commercial examples of the isocyanates useful in this invention including but not limited to, Vestanat T1890 (Huels America), Desmodur Z-4370 (Miles Inc.) Tolonate HDT (Rhone-Poulenc Inc.) and Cythane 3160 (American Cyanamid). T1890 and Z-4370 are both based on isophorone diisocyanate (IPDI) and Cythane 3160 is based on tetramethyl xylene diisocyanate, Tolonate HDT based on hexamethyl diisocyanate.

The components of a composition of the invention generally are incorporated in an organic solvent and/or diluent in which the materials employed are compatible and soluble to the desired extent. Organic solvents which may be utilized include, for example, alcohols, ketones, aromatic hydrocarbons, esters or mixtures thereof. Illustrative of organic solvents of the above type which may be employed are alcohols such as ethanol, propanol, isopropanol and butanol; ether alcohols such as ethylene glycol monoethyl ether, ethylene glycol monobutyl ether, propylene glycol monomethyl ether, and dipropylene glycol monoethyl ether, ketones such as methyl ethyl ketone, methyl n-butyl ketone, methyl n-amyl ketone, and methyl isobutyl ketone; esters such as n-butyl acetate, methoxy propyl acetate, and hexyl acetate; and aromatic hydrocarbons such as xylene, toluene, and naphtha.

Isocyanate crosslinking agents of utility in these coatings are essentially those commonly used in the art. They include but are not limited to isocyanate functional adducts, biurets, isocyanurates or allophanates of toluene diisocyanate, hexamethylene diisocyanate, isophorone diisocyanate and meta-tetramethyl xylene diisocyanate. The preferred index between the isocyanate groups and the total of all reactive groups contained in the coating with which isocyanates may react, is 0.5 to 2.5 on a molar basis.

Reactive diluents useful in these formulations are materials that provide an increase in solids to the formulation with a lower contribution to the application viscosity than the normal system covehicle. These reactive diluents may be polyesters, polyurethanes, alkyds, caprolactone derived polyols, acrylics, or any other material known to the art. The functionality can likewise be any known to the art, such as, primary, secondary, or tertiary hydroxyl, primary, secondary, or tertiary amine, oxazolidines, aldimines or ketimines of primary amines. Some examples of these materials are Union Carbide's caprolactone derived Tone series such as Tone 200, Tone 210, Tone 301, Tone 305, Tone 310; Inolex Chemical's Lexorez series such as Lexorez 1100-220, Lexorez 1140-190, Lexorez Z-130, Lexorez 3500, Lexorez 1400; Miles' Desmophen 670-B80 and Desmophen XP-7052; Rohm and Haas' QM-1007, CasChem's Caspol series such as Caspol 1715, Caspol 1842, Caspol 1962, Caspol 5002.

Additives of utility in these coatings are those commonly used in the art. Mar and slip agents and defoamers which find utility included but are not limited to Byk 141, Byk 304, Byk 306, Byk 307, Byk 325, Byk 331, Byk 341, Dow Corning #7, Dow Corning #54, Dow Corning #200, General Electric SF-69, Troy Chemical Troysol S366, Troy Chemical TroysolAFL, Tego Glide 410, Miles OL44.

Additives also finding utility are curing catalysts which include but are not limited to organic-metallic compounds such as dibutyltindioxide, dibutyltindilaurate, zinc octoate, amine compounds such as triethylamine, 2-diethylaminoethanol and triethylenediamine.

Also finding utility are flow and rheology modifying agents which include but are not limited to synthetic amorphous hydrophobic silica such as Degussa Aerosil R972, synthetic amorphous hydrophilic silica Degussa Aerosil 200, organo clays, polyethylene wax dispersions, polypropylene wax dispersions, polyamide wax dispersions, ethylene vinyl acetate wax dispersions. Agents such as Byk Anti-terra 202, Byk Anti-terra 204, Byk Anti-terra V, Byk W-960, Byk R-405, Byk-P104, Byk P-104s; Troy Chemical Troythix Antisag 4, Troy Chemical Troythix Antisettle; Raybo Chemical Raybo 6, Raybo Chemical Raybo 94, and Tego Chemie ZFS 460.

Also finding utility are pigment wetting and dispersing aids which include but are not limited to ICI Solsperse hyperdispersants such as Solsperse 5000, Solsperse 12000, Solsperse 22000 and Solsperse 24000; Troy Chemical Troysol CD1, Troy Chemical Troysol CD2 and Troy Chemical Troysol 98C; Daniel Products DispersAyd 9100; Raybo Chemical Raybo 63; Byk Anti-terra U, Byk Anti terra 202, Byk W-960, Byk P-104 Disperbyk 160, Disperbyk 162, Disperbyk 163; Nuodex Nuosperse 657; Nuodex Nuosperse 700.

Also finding utility in these coatings are ultraviolet light absorbers and stabilizers which include but are not limited to Sandoz Chemicals Sanduvor 3206, Sanduvor VSU, Sanduvor 3050; Ciba Geigy Corp Tinuvin 123, Tinuvin 292, Tinuvin 328, Tinuvin 440, Tinuvin 900, Tinuvin 1130, Tinuvin 384.

Also finding utility in these coatings are various types pigments common to the art which include but are not limited to titanium dioxide, graphite, carbon black, zinc oxide, cadmium sulfide, chromium oxide, zinc sulfide, zinc chromate, strontium chromate, barium chromate, lead chromate lead cyanamide, lead silico chromate, chromium oxide, zinc sulfide, yellow nickel titanium, yellow chromium titanium, red iron oxide, transparent red iron oxide, yellow iron oxides, transparent yellow oxide, black iron oxide, naphthol reds and browns, anthraquinones, dioxazine violet, isoindoline yellows, arylide yellow and oranges, ultramarine blue, phthalocyanine complexes, amaranth, quinacridones, halogenated thioindigo pigments, extender pigments such as magnesium silicate, aluminum silicate, calcium silicate, calcium carbonate, fumed silica, barium sulfate.

The coating composition can be applied using conventional spray equipment or high volume low pressure spray equipment resulting in a high quality finish. Other modes of application are roller coating, brushing, sprinkling, flow coating, dipping, electrostatic spraying, or electrophoresis. Exemplary metal substrates include such things as steel, aluminum, copper, zinc, magnesium and alloys thereof. The components of the compositions can be varied to suit the temperature tolerance of the substrate material. For example, the components can be constituted for air drying (e.g. less than 100° F.), low temperature cure (e.g.100° F.–180° F.), or high temperature cure ( e.g. over 180° F.). The coatings may be formulated to meet the requirements of the equipment intended for use during application.

The following examples are given to illustrate the low VOC coatings according to the present invention. In the examples the following three tests were used to determine the usefulness of the coating as a refinish paint.

Dust Free Time

The dust free time testing is intended to define the time that elapses between film application and the point when the film will not retain particulate material which may come to rest on the film. The test method is as follows:

The paint to be tested is spray applied to a 4" by 12" bare steel panel at a dry film thickness of 2.0 to 2.5 mils. At the appropriate time interval, approximately 1.0 gram of clean dry sea sand is applied to the surface. The sand is allowed to rest on the surface for 15 seconds, then the panel is struck sharply on its side in order to dislodge the sand. The paint is considered dust free if all or all but a few of the grains of sand are removed.

Tack Free Time

The tack free testing is intended to define the time that elapses between film application and the point when the film may be handled without permanent impressions being left in the film. The test method is as follows.

The paint to be tested is spray applied to a 4" by 12" bare steel panel at a dry film thickness of 2.0 to 2.5 mils. At the appropriate time interval, a 1 inch square piece of typing paper is placed on the film. A 100 gram, 1 inch square, flat weight is then placed on the paper for one minute. The weight is removed and panel is then struck sharply on its side in order to dislodge the paper. The paint is considered tack free when the paper comes off the panel when struck.

Gasoline Soak Resistance

The gasoline soak resistance test is intended to define the time required at normal ambient temperature (approx. 75 degrees fahrenheit) for a paint film to become sufficiently crosslinked to resist the attack of gasoline.

The paint to be tested is spray applied to a 4" by 12" bare steel panel at a dry film thickness of 2.0 to 2.5 mils. At the appropriate time, ⅛th of a cotton ball is placed on the panel and one milliliter of fresh, unleaded premium gasoline is applied to the cotton. A watch glass is then placed over the cotton. The watch glass is left on the panel for 5 minutes. The watch glass and cotton are then removed and any residual gasoline is removed from the surface with a soft cloth. The paint is considered gasoline resistant when no perceptible swelling occurs in the affected area of the paint.

Pendulum Hardness

Koenig pendulum hardness tester comprises a steel bar capable of oscillating on two hardened steel hemispheres fixed to the underside of the bar. A panel is held level in a suitable clamp above bench level and the pendulum bar is placed upon the surface to best tested with the steel hemispheres in contact with the panel. The pendulum is allowed to swing, measuring a "damping effect" and the time taken in seconds (equal to the number of swings multiplied by a factor of 1.4) for the decrease from full amplitude of the swing to a deflection of half amplitude (6° to 3°), is taken as the pendulum hardness.

Synthesis of Reactive Urea/Urethane (RUU) #1

This example of the invention, from the copending application, utilized two reactions including one to make an intermediate.

I. Intermediate
1. Composition:
   A. Vestanat T-1890 E 738.6 (Huls-IPDI isocyanurate, 70% NV, 12% —N=C=O)
      n-Butyl acetate 175.6 (urethane grade)
      Octadecanol 80.3
      Triisodecylphosphite 1.0
   B. Dibutyltin dilaurate 0.0056
      n-Butyl acetate 4.5 (urethane grade)
2. Process:
   A. Add components "A" to reactor and heat to 65–75 C.
   B. At 65–75 C, add components "B" and hold until the % NCO becomes constant.
   C. Cool and store Intermediate under Nitrogen until needed.

II. Finished Urethane/Urea Compound
1. Composition:
   A. 2-(t-Butylamino)ethanol 146.2
      n-Butyl acetate 126.5 (urethane grade)
   B. Intermediate 723.0 (from I)
   C. n-Butyl acetate 4.3 (urethane grade)
2. Process:
   A. Add component "A" to reactor and heat to 50C.
   B. Add component "B" to reactor over 180 minutes.
   C. Flush with component "C" then hold at temperature until % NCO=0 (ASTM D2572–87).

Synthesis of Reactive Urea/Urethane (RUU) #2

This example of the invention, from the copending application, utilized two reactions including one to make an intermediate.

I. Intermediate
1. Composition:
   A. Vestanat T-1890 E 738.6 (Huls-IPDI isocyanurate, 70% NV, 12% —N=C=O)
      n-Butyl acetate 175.6 (urethane grade)
      Octadecanol 80.3
      Triisodecylphosphite 1.0
   B. Dibutyltin dilaurate 0.0056
      n-Butyl acetate 4.5 (urethane grade)
2. Process:
   A. Add components "A" to reactor and heat to 65–75 C.
   B. At 65–75 C, add components "B" and hold until the % NCO becomes constant.
   C. Cool and store Intermediate under Nitrogen until needed.

II. Finished Urethane/Urea Compound
1. Composition:
   A. 2-(n-Butylamino)ethanol 146.2
      n-Butyl acetate 126.5 (urethane grade)
   B. Intermediate 723.0 (from I)
   C. n-Butyl acetate 4.3 (urethane grade)
2. Process:
   A. Add component "A" to reactor and heat to 50C.
   B. Add component "B" to reactor over 180 minutes.
   C. Flush with component "C" then hold at temperature until % NCO =0 (ASTM D2572–87).

Synthesis of Acrylic Resin #2

A flask fitted with an agitator, two addition feed pumps, a reflux condenser, a thermocouple probe, a heating mantle and an inert gas inlet was charged with 644.8 grams of methyl isoamyl ketone. The flask was purged with nitrogen. An inert atmosphere and mixing was maintained on the flask throughout the synthesis. The flask was heated to reflux (approximately 140 to 142 degrees Celsius). Each of the following premix solutions were added to the flask at a steady rate over a period of four hours. Premix #1 was 126.3 grams of ethyl methacrylate, 485.6 grams of hydroxyethyl methacrylate, 199.2 grams of methyl methacrylate, and 451.7 grams of styrene. Premix #2 was 86.0 grams of t-butyl peroctoate, and 38.9 grams of VM+P naphtha. The polymerization was carried out at reflux with the reflux temperature dropping throughout the addition of reactants to 136 degrees Celsius. After all material from premix #1 was added, 31.2 grams of methyl isoamyl ketone was used to rinse the addition apparatus into the flask. The flask was held at reflux for 30 minutes, then the following premix was added over a period of 5 minutes through addition pump #2. Premix #3 was 2.1 grams of t-butyl peroctoate, and 14.8 grams of methyl isoamyl ketone. Addition apparatus #2 was then rinsed into the flask with 4.8 grams of methyl isoamyl ketone. The flask was then held at reflux for 3.5 hours. The following premix was then added over a period of 5 minutes through addition apparatus #2. Premix #4 was 0.5 grams of Fascat 4100, and 2.8 grams of methyl isoamyl ketone. The addition apparatus was then flushed into the flask with 2.6 grams of methyl isoamyl ketone. At this point, the reflux temperature of the flask was 135 to 140 degrees Celsius. The flask was fitted with a Barrett trap and solvent was stripped from the flask until the flask reached a temperature of 182 degrees Celsius. Then 208.9 grams of soya fatty acid was placed into addition apparatus #1 and addition was started into the flask and was carried out at a steady rate over a period of 60 minutes. The solvent strip continued until the reflux temperature reached 184 to 188 degrees Celsius. The amount of solvent removed was about 18.9% of the batch. At this point the Barrett trap was emptied of distillate and charged with xylene. Reflux was maintained at 184 to 188 degrees Celsius while removing the water of esterification. The theoretical amount of water removed is 0.42%, or 13.4 grams for this batch size. When 75% of the theoretical water amount was removed the following endpoint control was started.

| SOLVENT BLEND | | REDUCTION | |
|---|---|---|---|
| n butyl acetate | 30% | batch | 50 grams |
| xylene | 10% | solvent blend | 27 grams |
| VM + P naphtha | 50% | | |

The batch was complete when the acid value on solution was less than 2 and the viscosity of the reduced batch was Z–Z1 (Gardner-Holt) at 25 degrees Celsius.

The batch was then cooled and thinned with the following. VM+P naphtha 462.1 grams, n-butyl acetate 295.9 grams. The weight solids were then adjusted to 60.0% with n-butyl acetate (approximately 122 grams).

Additive Package #1

The following materials were combined under agitation, 10.0 grams of dibutyl tin dilaurate, and 990.0 grams of xylene.

Additive Package #2

The following materials were added under agitation, 10.0 grams of dibutyl tin dilaurate, and 990.0 grams of methyl n-amyl ketone.

Additive Package #3

The following materials were combined under agitation, 475.0 grams of xylene, 475 grams of methyl n-amyl ketone, and 50.0 grams of Sanduvor VSU. Mixing was carried out until a homogeneous solution was achieved.

Additive Package #4

The following materials were combined under agitation, 200.0 grams of methyl n-amyl ketone, and 800.0 grams of reactive urea/urethane #2, and 4.7 grams of additive package #1.

Additive Package #5

The following materials were combined under agitation, 200.0 grams of methyl n-amyl ketone, and 800.0 grams of reactive urea/urethane #1, and 4.8 grams of additive package #1.

Additive Package #6

The following materials were combined under agitation, 819.5 grams of methyl n-amyl ketone, 154.0 grams of Tinuvin 123, 0.17 grams of dibutyl tin dilaurate, 16.3 grams of xylene, and 10.0 grams of Byk 331.

Additive Package #7

The following materials were combined under agitation, 631.6 grams of Desmophen XP 7052E, 2.3 grams of Byk 325, 262.0 grams of methyl n-amyl ketone, and 104.1 gams of methyl n-propyl ketone.

Isocyanate Hardener Solution #1

An isocyanate hardener solution was prepared as follows. Under an inert, anhydrous atmosphere, 710.0 grams of hexamethylene diisocyanate isocyanurate was mixed with 290.0 grams of urethane grade methyl n-amyl ketone. This mixture was filled into closed containers under an inert anhydrous atmosphere.

Isocyanate Hardener Solution #2

An isocyanate hardener solution was prepared as follows. Under an inert, anhydrous atmosphere, 540.0 grams of hexamethylene diisocyanate isocyanurate, 60.0 grams of hexamethylene diisocyanate biuret, 5.6 grams of additive package #1, and 394.4 grams of urethane grade methyl n-amyl ketone were mixed. This mixture was filled into closed containers under an inert anhydrous atmosphere.

Isocyanate Hardener Solution #3

An isocyanate hardener solution was prepared as follows. Under an inert, anhydrous atmosphere, 300.0 grams of hexamethylene diisocyanate isocyanurate, 428.8 grams of a 70% solution of isophorone diisocyanate isocyanurate (30% n-butyl acetate), 5.6 grams of additive package #1, and 265.6 grams of urethane grade methyl n-amyl ketone were mixed. This mixture was filled into closed containers under an inert anhydrous atmosphere.

Isocyanate Hardener Solution #4

An isocyanate hardener solution was prepared as follows. Under an inert, anhydrous atmosphere, 520.8 grams of hexamethylene diisocyanate isocyanurate, 1.0 gram of additive package #1, and 478.2 grams of urethane grade methyl n-amyl ketone were mixed. This mixture was filled into closed containers under an inert anhydrous atmosphere.

Isocyanate Hardener Solution #5

An isocyanate hardener solution was prepared as follows. Under an inert, anhydrous atmosphere, 300.6 grams of hexamethylene diisocyanate isocyanurate, 429.1 grams of a 70% solution of isophorone diisocyanate isocyanurate (30% n-butyl acetate), 0.1 grams of additive package #1, and 269.3 grams of urethane grade methyl n-amyl ketone were mixed. This mixture was filled into closed containers under an inert anhydrous atmosphere.

Pigment Dispersion Concentrate #1

A pigment dispersion concentrate was prepared as follows. A 4 liter mixing pot suitable for use on a high speed disc impeller was secured to a high speed disc impeller mixer and 1325.0 grams of acrylic resin #2 was charged into the pot. The following materials were added under moderate mixing, 40 grams of Disperbyk 163, 0.5 grams of guaiacol, 40 grams of n-butyl acetate, and 124.5 grams of xylene. These materials were mixed at moderate speed until homogeneous (approximately 10 minutes). Then, 600.0 grams of Ciba Geigy DPP Red BO pigment were added under moderate mixing and mixed until homogeneous. The mixer was then increased in speed to give a peripheral blade velocity of approximately 5000 lineal feet per second. This mixing was maintained for a period of fifteen minutes. The premix was then cooled to room temperature and the viscosity was adjusted to approximately 90 KU with type 100 aromatic. This adjustment required approximately 150 grams of type 100 aromatic. The premix was then passed through a suitable laboratory small media mill (Eiger 'Mini' motormill 250 or similar) until a grind fineness of 5 to 10 microns was achieved (as determined on a Hegman grind gauge).

Solvent Mixture #1

The following solvents were combined under agitation, 177.5 grams of methyl n-amyl ketone, 645.0 grams of methyl n-propyl ketone, and 177.5 grams of methyl n-hexyl ketone.

Topcoat Example #1

An automotive topcoat was prepared as follows. A 4 liter mixing pot suitable for use with a laboratory air mixer was secured to a lab mixer and 1042.5 grams of the acrylic resin #2 was charged into the pot. The following materials were added under mixing, 112.4 grams of xylene, 83.75 grams of n-butyl acetate, 1.25 grams of Byk 077, 5.0 grams of Byk 358, and 0.125 grams of dibutyl tin dilaurate. These materials were mixed until homogeneous (approximately 15 minutes). Then, 1250.0 grams of Pigment Dispersion Concentrate #1 were added under mixing. Mixing was maintained until all materials were homogeneous (approximately 30 minutes). Then, 225.6 grams of additive package #6 were added under agitation. Mixing was maintained until all materials were homogeneous (approximately 5 minutes).

Clearcoat Example #1

The following materials were added under agitation, 688.8 grams of acrylic resin #1, 17.0 grams of Tinuvin 292, 14.0 grams of Tinuvin 1130, 4.4 grams of additive package #1, 189.7 grams of methyl n-amyl ketone, 1.5 grams of Byk 141, 2.2 grams of Byk 325, 1.8 grams of diethylethanolamine, and 80.8 grams of methyl ethyl ketone. Mixing was maintained until all materials were homogeneous.

Clearcoat Example #2

The following materials were added under agitation, 411.0 grams of acrylic resin #1, 17.0 grams of Tinuvin 292, 14.0 grams of Tinuvin 1130, 4.5 grams of additive package #1, 118.0 grams of methyl n-amyl ketone, 1.5 grams of Byk 141, 2.0 grams of Byk 325, 2.0 grams of diethylethanolamine, and 82.5 grams of methyl ethyl ketone, and 347.5 grams of reactive urea/urethane #2 . Mixing was maintained until all materials were homogeneous.

Clearcoat Example #3

The following materials were added under agitation, 411.0 grams of acrylic resin #1, 17.0 grams of Tinuvin 292, 14.0 grams of Tinuvin 1130, 4.5 grams of additive package #1, 118.0 grams of methyl n-amyl ketone, 1.5 grams of Byk 141, 2.0 grams of Byk 325, 2.0 grams of diethylethanolamine, 82.5 grams of methyl ethyl ketone, and 347.5 grams of reactive urea/urethane #1 . Mixing was maintained until all materials were homogeneous.

Clearcoat Example #4

The following materials were added under agitation, 701.3 grams of acrylic resin #1, 19.6 grams of Tinuvin 292, 16.4 grams of Tinuvin 1130, 2.3 grams of additive package #1, 104.7 grams of additive package #3, 147.4 grams of methyl n-amyl ketone, 1.4 grams of Byk 141, 2.2 grams of Byk 325, 4.7 grams of diethylethanolamine. Mixing was maintained until all materials were homogeneous.

Clearcoat Example #5

The following materials were added under agitation, 450.0 grams of acrylic resin #1, 19.5 grams of Tinuvin 292, 16.5 grams of Tinuvin 1130, 2.5 grams of additive package #1, 105.0 grams of additive package #3, 83.0 grams of methyl n-amyl ketone, 1.5 grams of Byk 141, 2.0 grams of Byk 325, 5.0 grams of diethylethanolamine, and 315.0 grams of reactive urea/urethane #2. Mixing was maintained until all materials were homogeneous.

Clearcoat Example #6

The following materials were added under agitation, 449.0 grams of acrylic resin #1, 19.5 grams of Tinuvin 292, 16.5 grams of Tinuvin 1130, 2.5 grams of additive package #1, 105.0 grams of additive package #3, 79.0 grams of methyl n-amyl ketone, 1.5 grams of Byk 141, 2.0 grams of Byk 325, 5.0 grams of diethylethanolamine, and 320.0 grams of reactive urea/urethane #1. Mixing was maintained until all materials were homogeneous.

Comparative Coatings Example #1 Red Automotive Topcoat with and Without Reactive Urea/Urethane (RUU) Cured with Isocyanate Hardener The following materials were mixed together to form a ready for use automotive topcoat.

|  | Without RUU | With RUU #2 | With RUU #1 |
| --- | --- | --- | --- |
| Topcoat example #1 | 2533.9 gm | 1900.4 gm | 1900.4 gm |
| Additive package #4 | — | 504.2 gm | — |
| Additive package #5 | — | — | 608.9 gm |
| Isocyanate hardener #1 | 645.8 gm | 645.8 gm | 645.8 gm |
| Solvent mixture #1 | 510.2 gm | 510.2 gm | 645.8 gm |

The following are the results of testing done on these formulations.

| | | | |
| --- | --- | --- | --- |
| Initial viscosity #4 Ford | 18.9" | 17.2" | 18.0" |
| Viscosity increase in 4 hrs. | 62% | 51% | 37% |
| Dust free time | 75' | 45' | 45' |
| Tack free time | >6½hrs. | >5½ hrs. | 4 hrs. |
| Gasoline soak resistance | 4 days | 4 days | 4 days |
| Pendulum hardness (Koenig)- | | | |
| after 1 day | 46 sec. | 66 sec. | 67 sec. |
| after 6 days | 137 sec. | 157 sec. | 165 sec. |

Comparative Coatings Example #2 Clear 3.5 Voc Automotive Clearcoat with and Without Reactive Urea/Urethane, Cured with Isocyanate Hardener The following materials were mixed together to form a ready for use automotive topcoat.

|  | W/RUU #2 | W/RUU #1 | No RUU | No RUU |
| --- | --- | --- | --- | --- |
| Clearcoat example #4 | — | — | 1830.0 gm | 1830.0 gm |
| Clearcoat example #5 | 1848.0 gm | — | — | — |
| Clearcoat example #6 | — | 1855.0 gm | — | — |
| Isocyanate hardener #2 | 1248.8 gm | 1248.8 gm | 1248.8 gm | — |
| Isocyanate hardener #3 | — | — | — | 1392.6 gm |
| Additive solution #7 | 593.9 gm | 593.9 gm | 593.9 gm | 593.9 gm |

The following are the results of testing done on these formulations.

| | | | | |
| --- | --- | --- | --- | --- |
| Initial viscosity- #4 Ford cup | 19.5" | 18.9" | 18.4" | 18.5" |
| Pot life- 2× viscosity | 2 hrs. | 2 hrs. | 2¼ hrs. | 2¾ hrs. |
| Dust free time | 105' | 65' | 165' | 90' |
| Tack free time | 2¾ hrs. | 5½ hrs. | >6 hrs. | 4½ hrs. |
| Gasoline soak resistance | ≤4 days | ≤4 days | 3 days | 4 days |
| Pendulum hardness after 1 day | 42 sec. | 41 sec. | 27 sec. | 46 sec. |

Comparative Coatings Example #3 Low Voc Automotive Clearcoat with and Without Reactive Urea/Urethane, Cured with Isocyanate Hardener The following materials were mixed together to form a ready for use automotive topcoat.

|  | W/RUU #2 | W/RUU #1 | No RUU | No RUU |
| --- | --- | --- | --- | --- |
| Clearcoat example #1 | — | — | 2412.5 gm | 2412.5 gm |
| Clearcoat example #2 | 2436.7 gm | — | — | — |
| Clearcoat example #3 | — | 2444.6 gm | — | — |
| Isocyanate hardener #4 | 1206.1 gm | 1206.1 gm | 1206.1 gm | — |
| Isocyanate hardener #5 | — | — | — | 1259.8 gm |
| Methyl n-amyl ketone | — | — | — | 368.3 gm |

The following are the results of testing done on these formulations.

| | | | | |
| --- | --- | --- | --- | --- |
| Initial viscosity- #4 Ford cup | 19.8" | 17.3" | 16.4" | 15.6" |
| VOC (lbs.gal.) | 3.61 | 3.67 | 3.72 | 3.91 |
| Viscosity increase at 4 hrs. | 81% | 56% | 50% | 28% |
| Dust free time | 1½ hrs. | 1½ hrs. | 7 hrs. | 2½ hrs. |
| Pendulum hardness after 1 day | 50 sec. | 57 sec. | 14 sec. | 25 sec. |

Coatings Example #4 Conventional Voc Automotive Refinish Clearcoat

A conventional VOC automotive refinish clearcoat can be made by mixing the following ingredients together as indicated.

ACRYLIC RESIN #3

An acrylic resin can be made from the combination of butyl (meth)acrylate, hydroxypropyl (meth)acrylate, methyl (meth)acrylate, styrene and methacrylic acid which has a relative weight average molecular weight of 7,000 to 12,000, a hydroxyl number of 95 to 140 (mg of KOH per gram of non-volatile resin), an acid number of 5 to 20 (mg of KOH per gram of non-volatile resin) and a viscosity of $Z-Z^2$ (Gardner-Holdt) at 55% non-volatile.

REACTIVE UREA/URETHANE #1.
ISOCYANATE HARDENER SOLUTION #1.
ORGANIC SOLVENTS Common to the art.
ADDITIVES Mar and slip silicones, photostabilizers and catalysts all known to the art.

|  | Coatings Example #4 |
| --- | --- |
| Acrylic resin #3 | 25.4 |
| Reactive Urea/Urethane #1 | 16.4 |
| Isocyanate Hardener Solution #1 | 18.0 |
| Additives | 2.0 |
| Organic Solvents | 38.2 |

The clear coating of Example #4 can yield a sprayable composition of 12 to 18 seconds viscosity on a #4 Ford cup with a VOC of 4.7 to 5.1 lbs./gal. The applied film will have a dust free time of 3 to 20 minutes and a tack free time of 2 to 4 hours. The dried film will have the chemical resistance and durability properties expected of automotive refinish clear coatings.

We claim:

1. An ambient cure pigmented coating composition comprising:
   a) 5–65 percent by total weight of a crosslinkable co-vehicle comprising a polymer which is the polymerization product of monomers selected from the group consisting of acrylate and methacrylate hydroxy functional monomers and other vinyl monomers, said polymer having a glass transition temperature between about −3° C. and about 35° C. (using the Fox method of Tg calculation, a weight average molecular weight of up to 7000 and a hydroxyl value of 75–175 mg KOH/g,
   b) 10 to 50 percent by total weight of an-organic solvent,
   c) 1 to 90 percent by total weight of a reactive urea or urethane comprising reactive functionality other than -NCO groups thereon and consisting of the reaction product of alkanolamine, di- or poly-isocyanate and aliphatic alcohol,
   d) 0 to 30 percent by total weight of a reactive diluent,
   e) 10 to 50 percent by total weight isocyanate crosslinker,
   g) 0 to 10 percent by total weight of additives,
   h) h) 0.1 to 35 percent pigments.

2. The pigmented coating composition of claim 1 wherein the crosslinkable co-vehicle consists essentially of the polymerization product of ethylenically unsaturated acrylate and methacrylate monomers containing hydroxyl groups and vinyl monomers wherein at least one vinyl monomer is acid or glycidyl functional, wherein the copolymer has a glass transition temperature between about −3° C. to about 35° C. (using the Fox method of Tg calculation) and a relative weight average molecular weight of less than 10,000 and the resulting copolymer is subsequently reacted with a fatty acid through glycidyl groups on the polymer or to an oxirane functional compound through organic acid groups on the polymer.

3. The pigmented coating composition of claim 1 wherein the crosslinkable co-vehicle consists essentially of the polymerization product of ethylenically unsaturated acrylic and methacrylic monomers containing hydroxyl groups and vinyl monomers wherein at least one vinyl monomer is acid or glycidyl functional, and hydroxy functional vinyl monomers, and the resulting polymer is subsequently esterified by means of a natural or synthetic fatty acids.

4. The pigmented coating composition of claim 1 wherein the reactive urea or urethane compound comprises the reaction product of a polyisocyanate and a hydroxyl functional component with structure

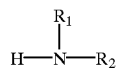

Where

R$_1$ is selected from the group consisting of alkyl and cycloaliphatic moieties, and a hydroxy substituted benzylic moiety, R$_2$ is selected from the group consisting of hydrogen, alkyl and cycloaliphatic moieties and a benzylic moiety with or without a hydroxyl group, and R$_1$+R$_2$ consists of less than or equal to 12 carbon atoms.

5. The pigmented coating composition of claim 4 wherein the reactive urea/ or urethane has a weight average molecular weight less than 6000, as measured by gel permeation chromatography relative to polystyrene standards, and a polydispersity of less than 2.0.

6. The pigmented coating composition of claim 1 wherein the reactive urea or urethane comprises the reaction product of a polyisocyanate and a hydroxyl functional component with structure:

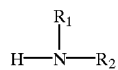

Where

R$_1$ is selected from the group consisting of alkyl cycloaliphatic moieties and a hydroxy substituted benzylic moiety, R$_2$ is selected from the group consisting of hydrogen, alkyl and cycloaliphatic moieties and a benzylic moiety with or without a hydroxyl group, and R$_1$+R$_2$ consists of less than or equal to 12 carbon atoms, and a monofunctional hydroxyl component.

7. The pigmented coating composition of claim 6 wherein the reactive urea or urethane has a weight average molecular weight less than 6000, as measured by gel permeation chromatography relative to polystyrene standards, and a polydispersity of less than 2.0.

8. An ambient cure clearcoat coating composition comprising:

a) 5–65 percent by total weight of a crosslinkable co-vehicle comprising a polymer which is the polymerization product of monomers selected from the group consisting of acrylate and methacrylate hydroxy functional monomers and other vinyl monomers, said polymer having a glass transition temperature between about −3° C. and about 35° C. (using the Fox method of Tg calculation, a weight average molecular weight of up to 7000 and a hydroxyl value of 75–175 mg KOH/g, b) 10 to 50 percent by total weight of an organic solvent, c) 1 to 90 percent by total weight of a reactive urea or urethane comprising reactive functionality other than -NCO groups thereon and consisting of the reaction product of alkanolamine, di- or poly-isocyanate and aliphatic alcohol, d) 0 to 30 percent by total weight of a reactive diluent, e) 10 to 50 percent by total weight isocyanate crosslinker, g) 0 to 10 percent by total weight of additives based on total coating composition weight.

9. The clearcoat coating composition of claim 8, wherein the crosslinkable co-vehicle consists essentially of the polymerization product of ethylenically unsaturated acrylic and methacrylic monomers containing hydroxyl groups and vinyl monomers wherein at least one vinyl monomer is acid or glycidyl functional, and hydroxy functional vinyl monomers, wherein the copolymer components are combined in such a manner to give a polymer with a moderate glass transition temperature between about −3° C. to about 35° C. (using the Fox method of Tg calculation) and a weight average molecular weight of less than 10,000 and the resulting polymer is subsequently reacted with a fatty acid through glycidyl groups on the polymer or to an oxirane functional compound through organic acid groups on the polymer.

10. The clearcoat coating composition of claim 9 wherein the crosslinkable co-vehicle consists essentially of the polymerization product of ethylenically unsaturated acrylate and methacrylate monomers containing hydroxyl groups and vinyl monomers wherein at least one vinyl monomer is acid or glycidyl functional, and hydroxy functional vinyl monomers, and the resulting polymer is subsequently esterified by means of a natural or synthetic fatty acids.

11. The clear coating composition of claim 9, wherein the reactive urea or urethane compound is comprised of the reaction product of a polyisocyanate and a hydroxyl functional component with structure

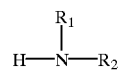

Where

R$_1$ is selected from the group consisting of alkyl and cycloaliphatic moieties and a benzylic moiety with a hydroxyl group, R$_2$ is selected from the group consisting of hydrogen, alkyl and cycloaliphatic moieties and a benzylic moiety with or without a hydroxyl group, and R$_1$+R$_2$, consists of less than or equal to 12 carbon atoms.

12. The clearcoat composition of claim 11, wherein the reactive urea/urethane compound has a weight average molecular weight less than 6000, as measured by gel permeation chromatography relative to polystyrene standards, and a polydispersity of less than 2.0.

13. The clear coating composition of claim 11, wherein the reactive urea or urethane is comprised of the reaction product of a polyisocyanate and a hydroxyl functional component with structure:

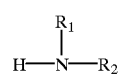

Where

R₁ is selected from the group consisting of alkyl and cycloaliphatic moieties and a benzylic moiety with a hydroxyl group, R₂ is selected from the group consisting of hydrogen, alkyl and cycloaliphatic moieties and a benzylic moiety with or without a hydroxyl group, and R₁+R₂ consists of less than or equal to 12 carbon atoms, and a monofunctional hydroxyl component.

14. The clear coating composition of claim 13 wherein the reactive urea or urethane compound has a weight average molecular weight less than 6000, as measured by gel permeation chromatography relative to polystyrene standards, and a polydispersity of less than 2.0.

15. The clearcoat coating composition of claim 6, wherein the crosslinkable co-vehicle consists essentially of the polymerization product of ethylenically unsaturated acrylate and methacrylate monomers containing hydroxyl groups and vinyl monomers wherein at least one vinyl monomer is acid or glycidyl functional, and hydroxy functional vinyl monomers, wherein the copolymer has a glass transition temperature between about 20° C. to about 80° C. (using the Fox method of Tg calculation) and a weight average molecular weight of from about 1,000 to 7,000.

* * * * *